(12) United States Patent
Bao et al.

(10) Patent No.: US 9,872,214 B2
(45) Date of Patent: Jan. 16, 2018

(54) METHOD AND DEVICE FOR INTRA-CELL HANDOVER

(71) Applicant: CHINA ACADEMY OF TELECOMMUNICATIONS TECHNOLOGY, Beijing (CN)

(72) Inventors: Wei Bao, Beijing (CN); Yi Yang, Beijing (CN); Haijing Hu, Beijing (CN); Bin Jiao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 14/395,812

(22) PCT Filed: Mar. 13, 2013

(86) PCT No.: PCT/CN2013/072529
§ 371 (c)(1),
(2) Date: Oct. 20, 2014

(87) PCT Pub. No.: WO2013/155909
PCT Pub. Date: Oct. 24, 2013

(65) Prior Publication Data
US 2015/0111577 A1 Apr. 23, 2015

(30) Foreign Application Priority Data
Apr. 20, 2012 (CN) .......................... 2012 1 0119448

(51) Int. Cl.
*H04W 36/08* (2009.01)
*H04W 36/24* (2009.01)
*H04W 84/04* (2009.01)

(52) U.S. Cl.
CPC ........... *H04W 36/08* (2013.01); *H04W 36/24* (2013.01); *H04W 84/047* (2013.01)

(58) Field of Classification Search
CPC . H04W 36/08; H04W 36/24; H04W 36/0055; H04W 88/04; H04W 84/047; H04W 36/0038
See application file for complete search history.

(56) References Cited

U.S. PATENT DOCUMENTS

| 8,396,479 B2 * | 3/2013 | Zhang | .................... | H04B 7/155 455/436 |
| 8,730,918 B2 * | 5/2014 | Huang | .................. | H04W 36/12 370/331 |

(Continued)

FOREIGN PATENT DOCUMENTS

| CN | 101945384 A | 1/2011 |
| CN | 102118808 A | 7/2011 |

(Continued)

OTHER PUBLICATIONS

3GPP; Technical Specification Group Services and System Aspects; 3GPP System Architecture Evolution (SAE); Security architecture; (Release 11) 3GPP TS 33.401 V11.3.0 (Mar. 2012); 120 pgs.*

(Continued)

*Primary Examiner* — Patrick Edouard
*Assistant Examiner* — Eboni Hughes
(74) *Attorney, Agent, or Firm* — Blakely, Sokoloff, Taylor & Zafman LLP (57) ABSTRACT

Disclosed in the present application are a method and a device for intra-cell handover, and a method and a device for path switching, used for avoiding network side and user equipment (UE) side next hop chaining counter (NCC) desychronization when a UE switches out of a relay node (RN), so as to avoid communication failure. The method for intra-cell handover provided in the present application comprises: an RN determining whether the value of the difference between the UE side NCC and the NCC most recently received by the RN and allocated for the UE by a mobility (Continued)

management entity (MME) serving the UE meets the preset triggering requirement for intra-cell handover; if the value of the difference meets the triggering requirement, then the RN initiates intra-cell handover.

11 Claims, 8 Drawing Sheets

(56) References Cited

U.S. PATENT DOCUMENTS

| | | | | | |
|---|---|---|---|---|---|
| 8,781,477 | B2* | 7/2014 | Zhang | | H04W 36/0005 455/439 |
| 8,855,069 | B2* | 10/2014 | Lohr | | H04L 1/1887 370/328 |
| 8,937,071 | B2* | 1/2015 | Eidam | | C07D 213/69 514/253.12 |
| 9,049,744 | B2* | 6/2015 | Waldhauser | | H04W 36/0055 |
| 9,131,495 | B2* | 9/2015 | Teyeb | | H04W 36/0011 |
| 9,258,745 | B2* | 2/2016 | Yu | | H04W 36/00 |
| 2011/0274276 | A1* | 11/2011 | Xu | | H04W 12/04 380/272 |
| 2012/0071190 | A1* | 3/2012 | Choi | | H04L 5/0037 455/517 |
| 2012/0082084 | A1* | 4/2012 | Balakrishnan | | H04W 72/1215 370/315 |
| 2012/0129499 | A1* | 5/2012 | Li | | H04L 63/068 455/411 |
| 2012/0164979 | A1* | 6/2012 | Bachmann | | H04L 63/164 455/411 |
| 2013/0288642 | A1* | 10/2013 | Yang | | H04W 36/0038 455/410 |
| 2014/0051442 | A1* | 2/2014 | Yang | | H04W 36/12 455/436 |
| 2015/0269028 | A1* | 9/2015 | Horn | | H04W 12/04 714/4.1 |

FOREIGN PATENT DOCUMENTS

| | | |
|---|---|---|
| CN | 102215537 A | 10/2011 |
| WO | WO 2011/068237 A1 | 6/2011 |
| WO | WO 2011/137805 A1 | 11/2011 |

OTHER PUBLICATIONS

3GPP; Technical Specification Group Radio Access Network; Evolved Universal Terrestrial Radio Access (E-UTRA); Relay architectures for E-UTRA (LTE-Advanced); (Release 9); 3GPP TS 36.806 V9.0.0 (Mar. 2010); 34 pgs.*
3GPP; Technical Specification, LTE; Evolved Universal Terrestrial Radio Access (E-UTRA); Radio Resource (RRC); Protocol specification; 3GPP TS 36.331 V9.10.0 (Mar. 2012); 259 pgs.*
PCT International Search Report for PCT Counterpart Application No. PCT/CN2013/072529 with English translation, 4 pgs. (dated Jun. 27, 2013).
3GPP, "3rd Generation Partnership Project; Technical Specification Group Services and System Aspects; 3GPP System Architecture Evolution (SAE); Security Architecture (Release 9)", 3GPP TS 33.401 V9.4.0, 104 pages, (Jun. 2010).
PCT Written Opinion of the International Search Authority for PCT Counterpart Application No. PCT/CN2013/072529, 22 pages (including English translation), (dated Jun. 27, 2013).
PCT Notification Concerning Transmittal of International Preliminary Report on Patentability (Chapter I of the Patent Cooperation Treaty) for PCT Counterpart Application No. PCT/CN2013/072529, 25 pages (including English translation), (dated Oct. 30, 2014).

* cited by examiner

METHOD AND DEVICE FOR INTRA-CELL HANDOVER

CROSS-REFERENCE TO RELATED APPLICATIONS

This patent application is a U.S. National Stage Application under 35 U.S.C. §371 of international Application No. PCT/CN2013/072529, filed on Mar. 13, 2013, entitled METHOD AND DEVICE FOR INTRA-CELL HANDOVER, designating the United States, and claiming priority from Chinese Patent Application No. 201210119448.6, filed with the Chinese Patent Office on Apr. 20, 2012 and entitled "Intra-cell handover method and apparatus", which was incorporated by reference in its entirety.

FIELD

The present invention relates to the field of communications and particularly to an intra-cell handover method and apparatus.

BACKGROUND

A Relay Node (RN) has been introduced to a Long Term Evolution Advanced (LTE-A) in order to extend network coverage. The RN is wirelessly connected with a Donor evolved Node B (DeNB), and the RN can be deployed in a train or another transportation vehicle for the purposes of lowering the number of handovers for a User Equipment (UE) in the transportation vehicle, improving the quality of a signal in a carriage, etc., where the RN deployed on the transportation vehicle is referred to as a mobile RN.

The number of handovers for the UE via an air interface will be lowered due to the introduction of the mobile RN without lowering the number of times for user plane data path switching to be performed in a core network of the UE. This may result in mismatch between the number of handovers for the UE and the number of times for switching in the core network of the UE and consequently in out-of-synchronization between security keys at the network side and the UE side. Eventually a normal service may be unavailable to the UE after being handed over out of a cell of the RN.

Figure 1:
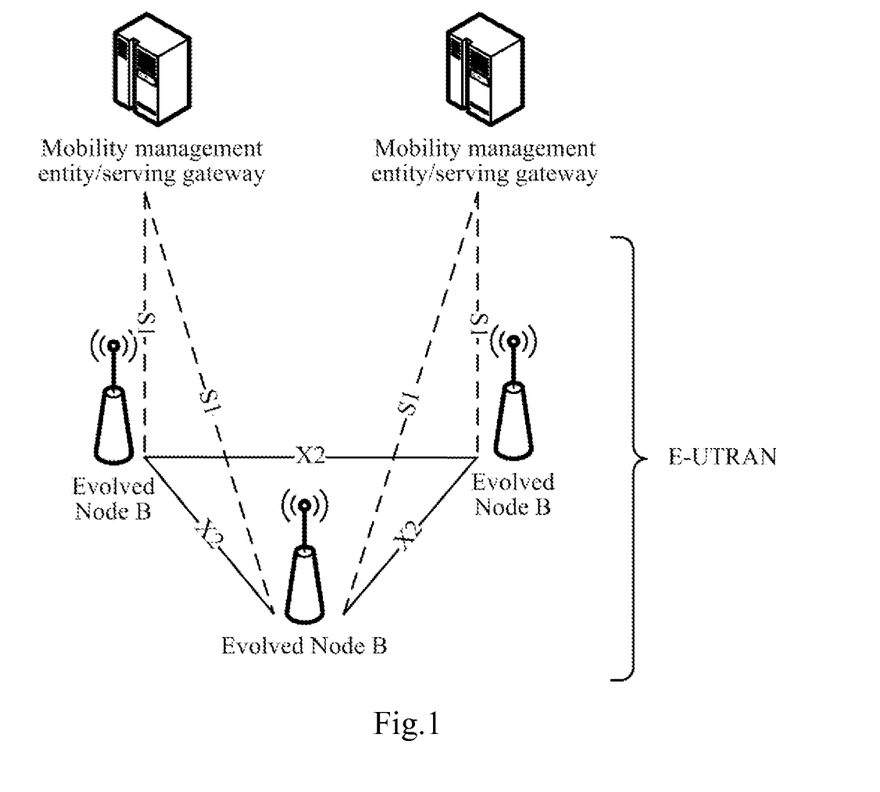
FIG. 1 is a schematic diagram of the network architecture of the E-UTRAN in the prior art.

FIG. 1 illustrates the network architecture of the LTE, where a Mobility Management Entity is connected with an evolved Node B (eNB) via an S1-MME interface; and the eNB functions as an access network and communicates with the UE via the air interface. There is an MME serving each UE attached to the network, and the MME is referred to as a serving MME of the UE.

Figure 2:
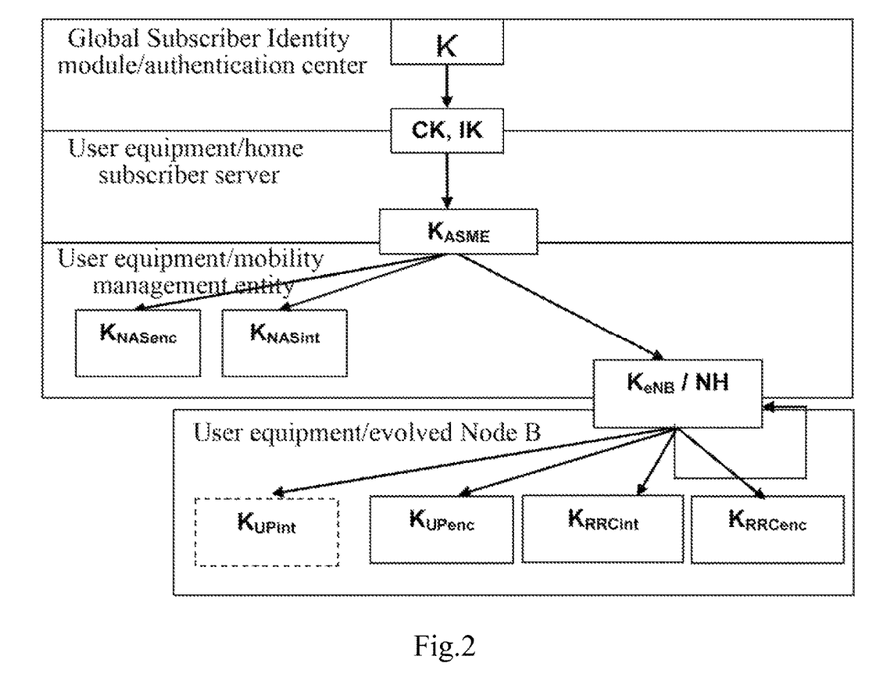
FIG. 2 is a schematic diagram of the key distribution/derivation architecture of the LTE system in the prior art.

FIG. 2 illustrates the key distribution/derivation architecture of the LTE system, where a part of keys are introduced as follows:

$K_{ASME}$ represents a key shared by the MME and the UE, where the UE and the MME serving the UE can derive the same key in an Authentication and Key Agreement (AKA) mechanism. Other keys can be derived from the $K_{ASME}$; and the $K_{ASME}$ will not be distributed to any eNB node.

$K_{eNB}$ represents an intermediate key shared by a serving eNB of the UE and the UE and can be derived from $K_{ASME}$; and the serving eNB of the UE can derive $K_{eNB}$ as follows:

The MME drives $K_{eNB}$ from $K_{ASME}$ and then transmits $K_{eNB}$ to the serving eNB of the UE; or During a handover, a handover target eNB can use derived $K_{eNB}^*$ as $K_{eNB}$;

$K_{eNB}^*$ is used as $K_{eNB}$ for the UE in communication with the handover target eNB. There are the following three sources for $K_{eNB}^*$ of the target eNB:

The source eNB derives $K_{eNB}^*$ from a Next Hop (NH) key obtained from the MME, and the source eNB transmits $K_{eNB}^*$ to the target eNB; or The source eNB derives $K_{eNB}^*$ from currently used $K_{eNB}$ and the source eNB transmits $K_{eNB}^*$ to the target eNB; or The target eNB drives $K_{eNB}^*$ from the NH obtained from the MME.

The three sources above for $K_{eNB}^*$ relates to two different sets of inputs for calculation of $K_{eNB}^*$;

$K_{eNB}^*$ is calculated from the NH, where input parameters are the NH, the Physical Cell Identity (PCI) of a target cell and the Absolute Radio Frequency Channel Number (ARFCN) of the target cell; and $K_{eNB}^*$ is calculated from $K_{eNB}$ used by the source eNB, where input parameters are current $K_{eNB}$, the PCI of the target cell and the frequency ARFCN of the target cell.

The UE under the source eNB shares currently used $K_{eNB}$ with the source eNB; and also the UE can derive a new NH from $K_{ASME}$. Thus the UE can determine the input parameters to be used and calculate $K_{eNB}^*$ consistent with the network side as long as it is known which of the two schemes above to calculate $K_{eNB}^*$ applies at the network side;

The NH is used for the UE and the eNB to calculate $K_{eNB}^*$ for forward security. The UE and the MME can calculate the NH from $K_{ASME}$ and $K_{eNB}$; or calculate the new NH from $K_{ASME}$ and the previous NH;

The so-called forward security refers to that the source eNB is unaware of $K_{eNB}$ used by the handover target eNB of the UE. As mentioned previously, $K_{eNB}$ used by the target eNB may be $K_{eNB}^*$carried by the source eNB in a handover request message, and it can be deemed in this case that no forward security is available. For the availability of forward security, the MME calculates and transmits a new set of {NH, NNC} to the target eNB in a path switching procedure during the handover, and the target eNB can calculate $K_{eNB}^*$unknown to the source eNB from the NH and thereafter initiate an intra-cell handover and transmit a Next Hop Chaining Counter (NCC) to the UE, and the UE calculates the corresponding NH from $K_{ASME}$ using the NCC in the same algorithm as the MME and further calculates $K_{eNB}^*$ from the NH in the same algorithm as the target eNB. Subsequent to the handover, the target eNB and the UE derive other keys from $K_{eNB}^*$ as $K_{eNB}$ and perform encryption and security protection from the purpose of forward security.

The NCC represents a counter associated with an NH to count the total number of generated NHs. The UE can synchronize the NH in use with the network by the received NCC and decide whether the next $K_{eNB}^*$ is calculated from current $K_{eNB}$ or from a new NH, where the length of the NCC is 3 bits.

Figure 3:
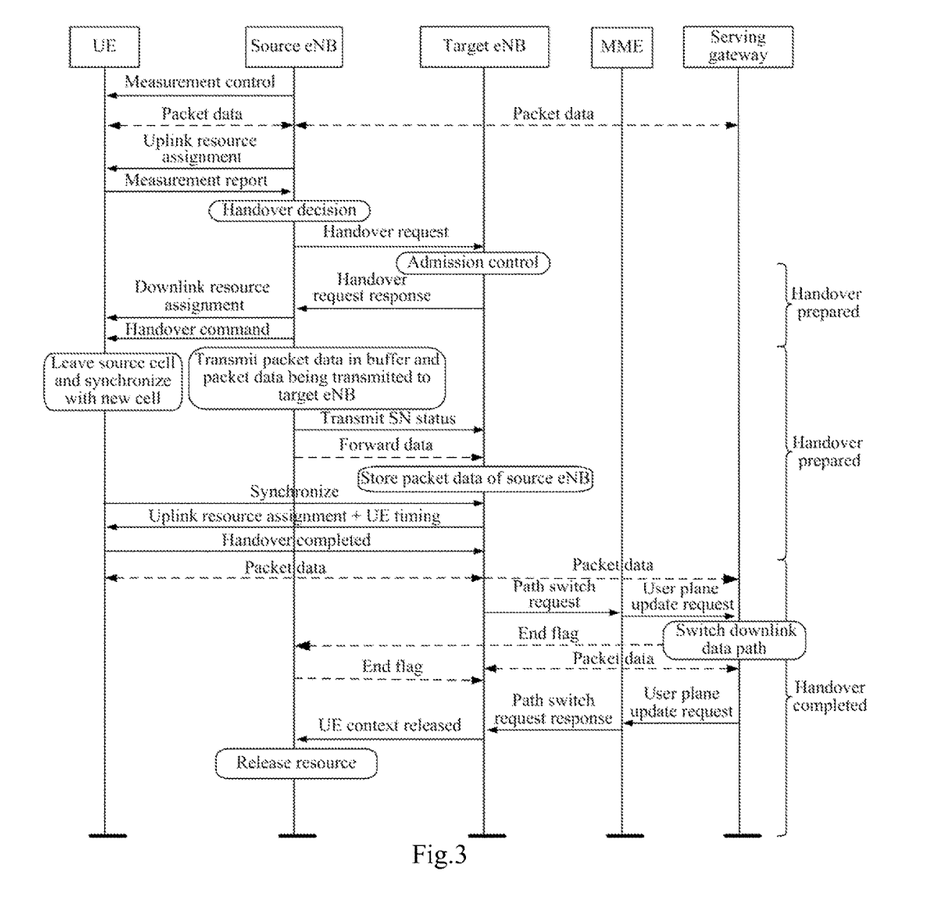
FIG. 3 is a schematic diagram of the X2 handover procedure in the prior art.

FIG. 3 illustrates an X2 handover process in which the target eNB obtains $K_{eNB}^*$ and the NCC from the handover request message transmitted by the source eNB, where the NCC will be transmitted to the UE in a handover command. The UE checks the received NCC against with its stored NCC, and if both of them are the same, then it is determined that $K_{eNB}^*$ transmitted by the source eNB to the target eNB has been calculated from $K_{eNB}$ in the source cell, and the UE calculates $K_{eNB}^*$ from $K_{eNB}$ in the source cell. If the received NCC is different from the NCC stored by the UE, then it is determined that $K_{eNB}^*$ transmitted by the source eNB to the target eNB has been calculated from the NH corresponding to the NCC received by the source eNB, and the UE calculates the difference Delta between the received NCC and its stored NCC as follows:

$$\text{Delta} = \begin{cases} NCCnew - NCCold & \text{(if } NCCnew > NCCold) \\ NCCnew - NCCold + 8 & \text{(if } NCCnew < NCCold) \end{cases},$$

Where NCC_new represents the NCC received from the handover command; and the NCC_old represents the NCC stored by the UE. The UE calculates the NH used at the network side from Delta and further calculates $K_{eNB}*$, transmitted by the source eNB to the target eNB, from the NH. For example, the NCC stored by the UE is 7, and the received NCC is 1. The UE calculates the delta as 1-7+8=2. The UE calculates a new NH (corresponding to (NCC_old+1) mod 8. i.e., 0) from the currently used NH (corresponding to NCC_old, i.e., 7) and $K_{ASME}$; and further calculates the NH used at the network side (corresponding to (NCC_old+2) mod 8. i.e., 1) from the new NH and $K_{ASME}$, that is, the NH is calculated iteratively for a number Delta (here 2) of times. At this time the NH used by the UE is the same as, i.e., synchronized with, that used at the network side, and here the UE updates the stored NCC_old value with NCC_new. After the NH is synchronized, the UE calculates $K_{eNB}*$ by using the synchronized NH, the PCI of the target cell and the frequency ARFCH of the target cell as data parameters.

After the UE accesses the target cell, the serving MME of the UE will transmit a new pair of {NH, NCC} (including the NH and the NCC corresponding to the NH) to the target eNB in a Path Switch Request ACK message for use by the eNB during a subsequent handover of the UE.

The maximum difference between NCCs allowed for out-of-synchronization of the NCCs is 7 due to the 3-bit length of the NCC. By way of an example, if the UE is X2 handed over consecutively for 8 times, and the source eNB calculates $K_{eNB}*$ transmitted to the target eNB from currently used $K_{eNB}$ (it is assumed that $K_{eNB}$ is calculated from an NHx corresponding to an NCCx) in each handover, then the source eNB transmits the NCC equal to the NCCx to the target eNB in preparation of each handover. The target eNB transmits each handover command carrying the NCCx to the UE. However the MME is unaware that the latest NCC has not been used by the source eNB, and the MME will allocate a new pair of {NCC_new, NH} to the UE in a Path Switch Request ACK message, where NCC_new=(NCCx+1) mod 8 for the first handover, NCC_new=(NCCx+2) mod 8 for the second handover, . . . , and NCC_new=(NCCx+8) mod 8 for the eighth handover. Stated otherwise, if no new NH has been used by the source eNB for each of seven consecutive handovers, then the NH used by the UE can not be synchronized with that used at the network side in the eighth handover even if the target eNB uses a new NH and transmits an NCC_new corresponding to the new NH to the UE. This is because that the received difference between the NCC_new and the NCCx is 0 whereas the real difference between the NCC_new and the NCCx is 8. That is, the NH used by the network is a result of eight iterative calculations by the UE from the NH, and such out-of-synchronization can not be corrected by the UE, where out-of-synchronization of the NHs due to the difference of or above 8 between the NCC corresponding to the NH used at the UE side and the NCC corresponding to the latest NH allocated at the network side will be referred to as unrecoverable out-of-synchronization.

Figure 4:
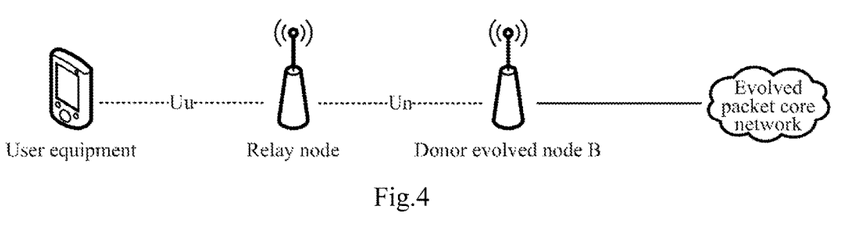
FIG. 4 is a schematic diagram of the network architecture of the E-UTRAN including the RN in the prior art.

At present, a relay node has been introduced by various manufacturers and standardization organizations to a cellular system for extended coverage in order to address the issues of a network deployment cost and coverage. An RN, unchanged in location, which is referred to as a stationary relay node, does not support mobility. FIG. 4 illustrates the network architecture of the LTE-A system to which an RN is introduced, where the RN accesses a core network through a donor cell under a DeNB without any direct wired interface to the core network, and each RN can control one or more cells. In this architecture, an interface between a UE and the RN is referred to as a Uu interface, and an interface between the RN and the DeNB is referred to as a Un interface.

In the case of a mobile RN, the RN needs to be handed over the source DeNB and a target DeNB. Subsequent to the handover, the RN needs to notify a serving MME of the UE (served by the RN) about a change in path of uplink and downlink data so that data originally transmitted to the source DeNB needs to be transmitted to the target DeNB such that the downlink data of the UE can arrive at the RN and be transmitted to the UE. The procedure above of path switching for the UE needs to be performed in a path switching procedure. The serving MME of the UE will allocate a new pair of an NH and an NCC to the UE in a Path Switch Request ACK message.

Figure 5:
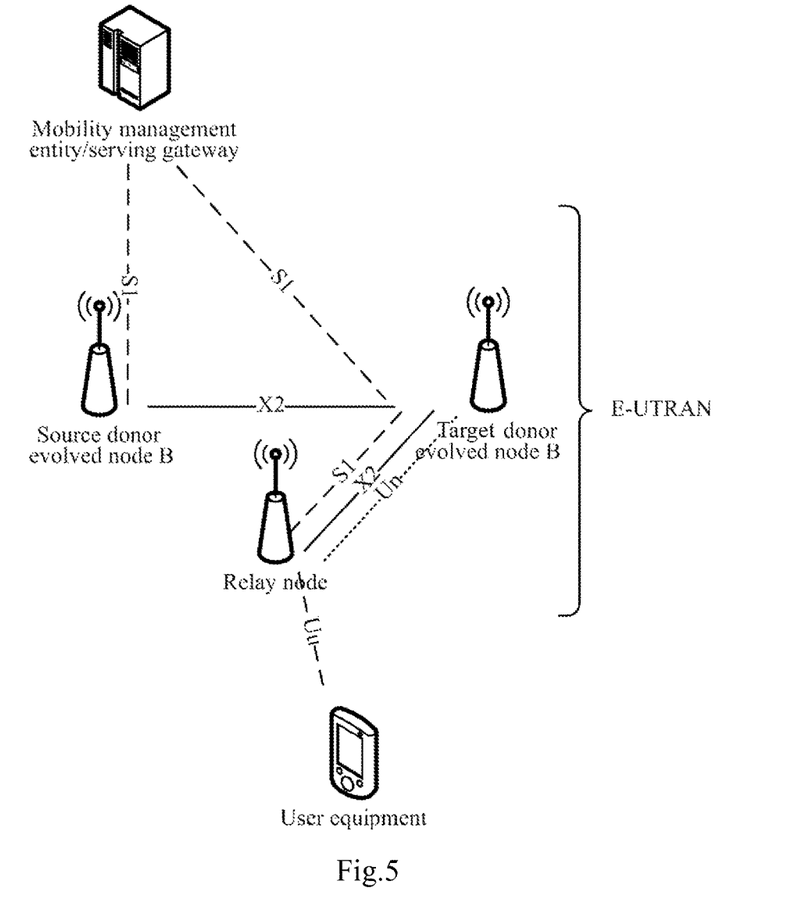
FIG. 5 is a schematic diagram of switching the RN in the prior art.

Referring to FIG. 5, an RN is a serving eNB of a UE connected to the RN. The RN is stationary relative to the UE and the serving eNB of the UE is the RN throughout movement with a transportation vehicle. Thus the UE does not need to be handed over via an air interface. However the RN needs to be handed over between different DeNBs, and unrecoverable out-of-synchronization will occur with the NHs used by the MME and the UE after the RN has been handed over consecutively for eight times.

After unrecoverable out-of-synchronization occurs with the NHs used by the MME and the UE, if the UE is handed over out of the cell of the RN (for example, the UE is carried by the user out of the carriage), then the UE will be unable to calculate the NH used by the MME once any of the eNBs chooses to update a key with the NH transmitted by the MME, thus resulting in an error in encryption or integrity protection of the air interface and consequentially in an interruption of communication.

SUMMARY

Embodiments of the invention provide an intra-cell handover method and apparatus and a path switch method and apparatus so as to avoid out-of-synchronization of NCCs between the network side and the UE side when the UE is handed over out of an RN, which might otherwise result in failure of communication.

An embodiment of the invention provides an intra-cell handover method including:

a Relay Node (RN) judging whether the difference between a Next Hop Chaining Counter (NCC) at the User Equipment (UE) side, and an NCC lastly received by the RN, which is allocated to the UE by a serving Mobility Management Entity (MME), satisfies a preset intra-cell handover trigger condition; and the RN initiating an intra-cell handover when the difference satisfies the trigger condition.

An embodiment of the invention provides a path switch method including:

when a Relay Node (RN) is handed over between Donor evolved Node Bs (DeNBs), the DeNB initiating a path switching procedure;

the DeNB receiving from a serving MME of a User Equipment (UE) a Next Hop Chaining Counter (NCC) allocated by the MME to the UE in the path switching procedure; and the DeNB transmitting the NCC to the RN.

An embodiment of the invention provides a path switch method including:

an evolved Node B (eNB) determining indication information to instruct a serving Mobility Management Entity (MME) of a User Equipment (UE) not to allocate a new Next Hop (NH) key to the UE in a path switch procedure; and the eNB transmitting the indication information to the serving MME of the UE.

An embodiment of the invention provides a path switch method including:

a serving Mobility Management Entity (MME) of a User Equipment (UE) receiving indication information transmitted by an evolved Node B (eNB) to instruct the serving MME of the UE not to allocate a new Next Hop (NH) key to the UE in a path switch procedure;

the serving MME of the UE judging from the indication information whether a new NH needs to be generated for the UE in the path switch procedure; and the serving MME of the UE transmitting the latest NH corresponding to the UE to a path switch target eNB.

An embodiment of the invention provides an intra-cell handover apparatus including:

an out-of-synchronization judgment unit configured to judge whether the difference between a Next Hop Chaining Counter (NCC) at the User Equipment (UE) side, and an NCC lastly received by the RN, which is allocated to the UE by a serving Mobility Management Entity (MME), satisfies a preset intra-cell handover trigger condition; and a handover initiation unit configured to initiate an intra-cell handover when the difference satisfies the trigger condition.

An embodiment of the invention provides a path switch apparatus including:

an initiation unit configured to initiate a path switching procedure when a Relay Node (RN) is handed over between Donor evolved Node Bs (DeNBs);

an NCC reception unit configured to receive from a serving MME of a User Equipment (UE) a Next Hop Chaining Counter (NCC) allocated by the MME to the UE in the path switching procedure; and an NCC transmission unit configured to transmit the NCC to the RN.

An embodiment of the invention provides a path switch apparatus including:

an indication information determination unit configured to determine indication information, wherein the indication information is configured to instruct a serving Mobility Management Entity (MME) of a User Equipment (UE) not to allocate a new Next Hop (NH) key to the UE in a path switch procedure; and an indication information transmission unit configured to transmit the indication information to the serving MME of the UE.

An embodiment of the invention provides a path switch apparatus including:

an indication information reception unit configured to receive indication information transmitted by an evolved Node B (eNB) to instruct a serving Mobility Management Entity (MME) of a User Equipment (UE) not to allocate a new Next Hop (NH) key to the UE in a path switch procedure;

a judgment unit configured to judge from the indication information whether a new NH needs to be generated for the UE in the path switch procedure; and an NH transmission unit configured to transmit the latest NH corresponding to the UE to a path switch target eNB.

In the embodiments of the invention, a Relay Node (RN) judges whether the difference between a Next Hop Chaining Counter (NCC) at the User Equipment (UE) side, and an NCC lastly received by the RN, which is allocated to the UE by a serving Mobility Management Entity (MME), satisfies a preset intra-cell handover trigger condition; and the RN initiates an intra-cell handover when the difference satisfies the trigger condition to thereby avoid out-of-synchronization of the NCCs between the network side and the UE side when the UE is handed over out of the RN, which might otherwise result in failure of communication.

Correspondingly in the embodiments of the invention, when a Relay Node (RN) is handed over between Donor evolved Node Bs (DeNBs), the DeNB initiates a path switching procedure; the DeNB receives from a serving Mobility Management Entity (MME) of a User Equipment (UE) a Next Hop Chaining Counter (NCC) allocated by the MME to the UE in the path switching procedure; and the DeNB transmits the NCC to the RN, so that the RN at the DeNB side can obtain the NCC allocated by the serving MME of the UE to the UE.

In the embodiments of the invention, an evolved Node B (eNB) determines indication information to instruct a serving Mobility Management Entity (MME) of a User Equipment (UE), wherein the indication information is configured to indicate not to allocate a new Next Hop (NH) key to the UE in a path switch procedure; and the eNB transmits the indication information to the serving MME of the UE, so that the serving MME of the UE can be instructed by the eNB not to allocate a new NH in the path switch procedure to thereby avoid out-of-synchronization of NCCs between the network side and the UE side when the UE is handed over out of an RN, which might otherwise result in failure of communication.

Correspondingly in the embodiments of the invention, a serving Mobility Management Entity (MME) of a User Equipment (UE) receives indication information transmitted by an evolved Node B (eNB), wherein the indication information is configured to instruct the serving MME of the UE not to allocate a new Next Hop (NH) key to the UE in a path switch procedure; the serving MME of the UE judges from the indication information whether a new NH needs to be generated for the UE in the path switch procedure; and the serving MME of the UE transmits the latest NH corresponding to the UE to a path switch target eNB so that the eNB can obtain the latest NH allocated by the serving MME of the UE to the UE.

DETAILED DESCRIPTION

Embodiments of the invention provide an intra-cell handover method and apparatus and a path switch method and apparatus so as to avoid out-of-synchronization of NCCs between the network side and the UE side when the UE is handed over out of an RN, which might otherwise result in failure of communication.

In technical solutions according to embodiments of the invention, unrecoverable out-of-synchronization can be avoided from occurring with NHs used by a UE and an MME generally in the following two implementations:

In a first implementation, an RN initiates an intra-cell handover (both handover source and target cells are the same cell served by the RN) to synchronize NHs used by a UE and an MME before unrecoverable out-of-synchronization occurs with the NHs of the UE and the MME. The RN obtains an NCC and the NH transmitted by the serving MME of the UE (the NCC will be referred hereinafter to as a network-side NCC); and the RN also knows an NCC corresponding to the NH used at the UE side (referred hereinafter to as a UE-side NCC). The RN triggers the UE to be handed over via an air interface before the difference between the network-side NCC and the UE-side NCC reaches the maximum allowable out-of-synchronization value (the value is 8 in the existing protocol).

In a second implementation, the serving MME of the UE is instructed not to allocate a new NH in a path switching procedure. When the UE is connected to the network through a mobile RN, the serving MME of the UE will not generate a new pair of {NH, NCC} if the RN is handed over between DeNBs.

The technical solutions according to the embodiments of the invention will be described below with reference to the drawings from the perspectives of different network node sides respectively.

Figure 6:
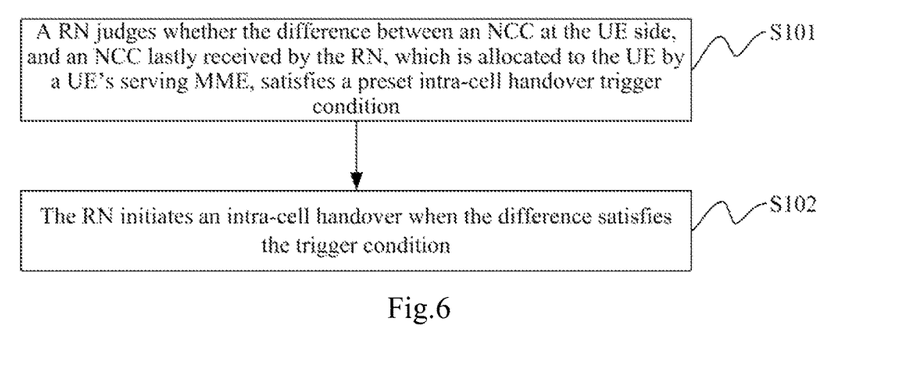
FIG. 6 is a schematic flow chart of an intra-cell handover method at the RN side according to an embodiment of the invention.

In the first implementation above, referring to FIG. 6, an intra-cell handover method at the RN side according to an embodiment of the invention includes:

S101. An RN judges whether the difference between an NCC at the UE side, and an NCC lastly received by the RN, which is allocated to the UE by a UE's serving MME, satisfies a preset intra-cell handover trigger condition; and S102. The RN initiates an intra-cell handover when the difference satisfies the trigger condition.

Corresponding NCCs and NHs are stored at the MME side for respective UEs.

Preferably the RN judges whether the difference between the NCC at the UE side, and the NCC lastly received by the RN, which is allocated to the UE by the UE's serving MME, satisfies the preset intra-cell handover trigger condition as follows:

It is judged whether the difference between the NCC at the UE side, and the NCC lastly received by the RN, which is allocated to the UE by the UE's serving MME, is below or equal to a preset intra-cell handover trigger value, and if so, then it is determined that the difference satisfies the trigger condition; otherwise, it is determined that the difference does not satisfy the trigger condition.

Preferably the preset intra-cell handover trigger value is $2^n-1$, where n represents the number of bits of an NCC.

Preferably n represents a positive integer above or equal to 3, e.g., 3, 4, etc.

Alternatively the RN judges whether the difference between the NCC at the UE side, and the NCC lastly received by the RN, which is allocated to the UE by the UE's serving MME, satisfies the preset intra-cell handover trigger condition as follows:

It is judged whether the difference between the NCC at the UE side, and the NCC lastly received by the RN, which is allocated to the UE by the UE's serving MME, lies within a preset range of intra-cell handover trigger values, and if so, then it is determined that the difference satisfies the trigger condition; otherwise, it is determined that the difference does not satisfy the trigger condition.

For example, if the difference between the NCC at the UE side, and the NCC lastly received by the RN, which is allocated to the UE by the serving MME is 5, and the preset range of intra-cell handover trigger values is from 3 to 7, then the RN can also be triggered to initiate an intra-cell handover.

In summary, the intra-cell handover trigger condition is preset to thereby ensure the RN can initiate an intra-cell handover before unrecoverable out-of-synchronization occurs with the NCC at the UE side, and the NCC lastly received by the RN, which is allocated to the UE by the serving MME, to thereby avoid unrecoverable out-of-synchronization from occurring with the NCC at the UE side, and the NCC lastly received by the RN, which is allocated to the UE by the serving MME.

Preferably the method further includes:

When the RN is handed over between DeNBs, the RN receives the NCC, forwarded by the target DeNB, which is allocated to the UE by the serving MME; or When the RN is handed over between DeNBs, the RN receives the NCC, transmitted by the serving MME, which is allocated by the serving MME to the UE.

Figure 7:
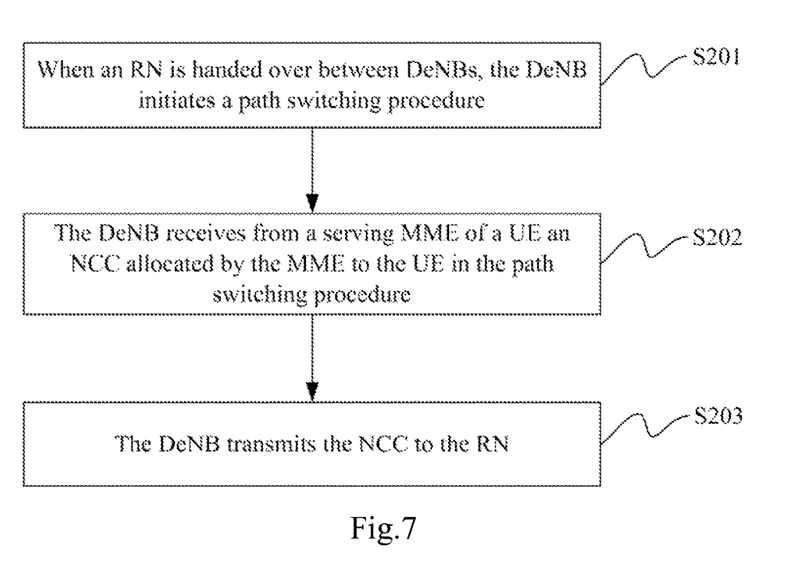
FIG. 7 is a schematic flow chart of a path switch method at the DeNB side according to an embodiment of the invention.

In correspondence to the first implementation above, referring to FIG. 7, a path switch method at the DeNB side according to an embodiment of the invention includes:

S201. When an RN is handed over between DeNBs, the DeNB initiates a path switching procedure;

S202. The DeNB receives from a serving MME of a UE an NCC allocated by the MME to the UE in the path switching procedure; and S203. The DeNB transmits the NCC to the RN.

Preferably the DeNB receives from the serving MME of the UE the NCC allocated by the MME to the UE in the path switching procedure as follows:

The DeNB receives from the serving MME of the UE the NCC allocated by the MME to the UE in a Path Switch Request ACK message.

Figure 8:
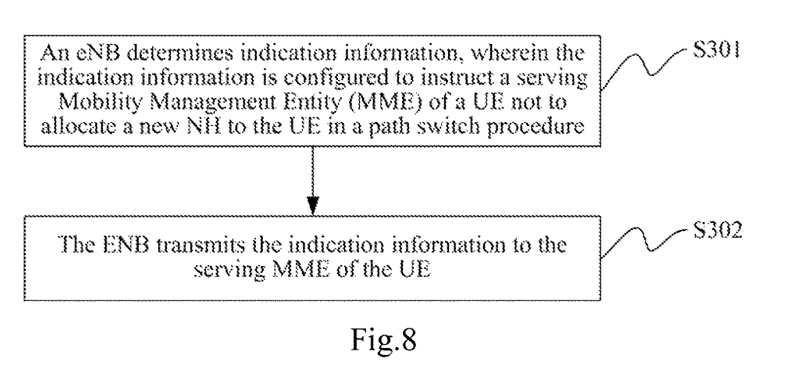
FIG. 8 is a schematic flow chart of a path switch method at the eNB side according to an embodiment of the invention.

In correspondence to the second implementation above, referring to FIG. 8, a path switch method at the eNB side according to an embodiment of the invention includes:

S301. An eNB determines indication information, wherein the indication information is configured to instruct a serving Mobility Management Entity (MME) of a UE not to allocate a new NH to the UE in a path switch procedure; and S302. The ENB transmits the indication information to the serving MME of the UE.

Preferably the eNB transmits the indication information to the serving MME of the UE as follows:

The eNB transmits a Path Switch Request message carrying the indication information to the serving MME of the UE.

Preferably the indication information indicates:

Whether the UE for which the Path Switch Request message is intended is connected to the network through an RN; or Whether a new NH needs to be generated for the current path switch procedure.

Figure 9:
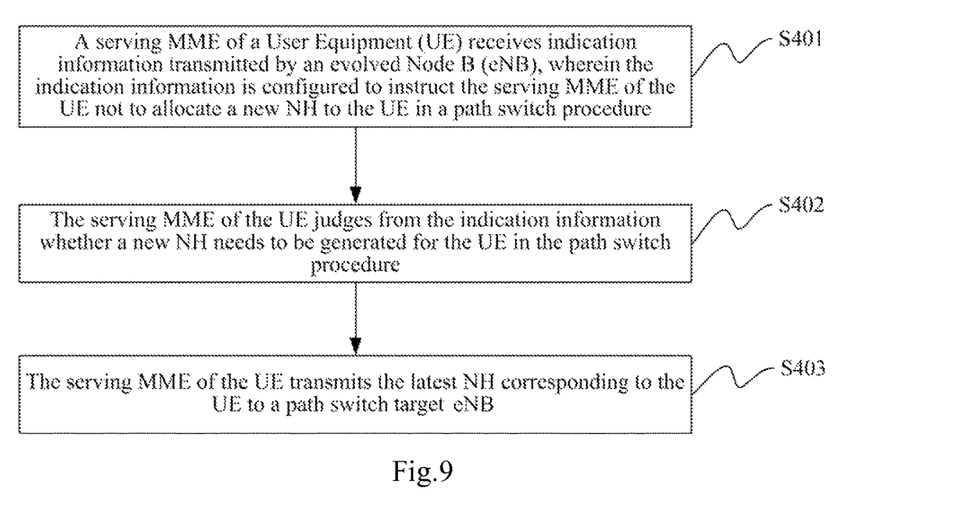
FIG. 9 is a schematic flow chart of a path switch method at the MME side according to an embodiment of the invention.

In correspondence to the second implementation above, referring to FIG. 9, a path switch method at the serving MME side of a UE according to an embodiment of the invention includes:

S401. A serving MME of a User Equipment (UE) receives indication information transmitted by an evolved Node B (eNB), wherein the indication information is configured to instruct the serving MME of the UE not to allocate a new NH to the UE in a path switch procedure;

S402. The serving MME of the UE judges from the indication information whether a new NH needs to be generated for the UE in the path switch procedure; and S403. The serving MME of the UE transmits the latest NH corresponding to the UE to a path switch target eNB.

Preferably the serving MME of the UE receives the indication information transmitted by the eNB as follows:

The serving MME of the UE receives a Path Switch Request message transmitted by the eNB and obtains the indication information from the message.

Preferably the serving MME of the UE judges from the indication information whether a new NH needs to be generated for the UE in the path switch procedure as follows:

When the indication information in the Path Switch Request message indicates that the UE is connected to the network through an RN, the serving MME of the UE will not perform any operation on the currently stored NH corresponding to the UE; otherwise, the serving MME generates a new NH corresponding to the UE from the currently stored NH corresponding to the UE; or When the indication information in the Path Switch Request message indicates that no new NH needs to be generated, the serving MME of the UE will not perform any operation on the currently stored NH corresponding to the UE; otherwise, the serving MME generates a new NH corresponding to the UE from the currently stored NH corresponding to the UE.

Several particular embodiments will be described below.

First Embodiment (corresponding to the first implementation):

In the step 1, an RN synchronizes an NCC at the UE side in a handover process; and it is assumed that the NCC at the UE side is synchronized to NCC_old;

When the UE is handed over to a cell controlled by the RN, the RN generates a handover command carrying NCC_old. The UE will be synchronized automatically to NCC_old carried in the handover command.

In the step 2, when the RN is handed over between DeNBs, the handover target DeNB or the RN needs to switch uplink and downlink paths of UE data (from the source DeNB to the target DeNB) in a path switching procedure.

If the path switching procedure is initiated by the target DeNB, then the target DeNB receives from a serving MME of the UE a pair of {NH, NCC} allocated to the UE in a Path Switch Request ACK message, and the target DeNB transmits the pair of {NH, NCC} to the RN; and If the path switching procedure is initiated by the target RN, then the RN receives from a serving MME of the UE a pair of {NH, NCC} allocated to the UE in a Path Switch Request ACK message, where the NCC received by the RN from the RN or directly from the MME is assumed as NCC_new.

In the step 3, the RN calculates the difference between NCC_new and NCC_old and initiates an intra-cell handover upon determining the intra-cell handover to be performed to synchronize the NCCs at the network side and the UE side.

The difference Delta between NCC_new and NCC_old is calculated in the equation of:

$$\text{Delta} = \begin{cases} NCCnew - NCCold & (\text{if } NCCnew \geq NCCold) \\ NCCnew - NCCold + 2^{\wedge}n & (\text{if } NCCnew < NCCold) \end{cases},$$

Where n represents the number of bits of an NCC, and the intra-cell handover is determined to be performed when the difference between the NCC at the UE side and the NCC allocated by the serving Mobility Management Entity (MME) of the UE to the UE is equal to a preset intra-cell handover trigger value, for example, the trigger value can be any value above 0 and below 8 with the 3-bit length of an NCC. An occasion to trigger the handover is determined dependent upon an implementation of the RN as long as the Delta lies within the range above.

Reasonable selection of a handover occasion facilitates an improvement in performance of the system. In a preferred implementation, for example, the RN initiates an intra-cell handover when the Delta is $2^{\wedge}n-1$, where n represents the number of bits of an NCC. n=3 with the 3-bit length of an NCC, so the RN initiates an intra-cell handover when the Delta is equal to 7 to thereby avoid both frequency handovers of the UE via an air interface (a handover of the UE will be triggered only if the RN is handed over between DeNBs for seven times) and out-of-synchronization of the NCCs at the UE and network sides.

Furthermore, the number of bits of an NCC can be extended in addition to the first embodiment to thereby further lower the frequency of a handover of the UE via the air interface.

For example, n=4 with the extended 4-bit length of an NCC, so out-of-synchronization of the NCCs at the UE and network sides can be avoided from occurring as long as the RN ensures the Delta to be below or equal to 15 when an intra-cell handover is initiated.

Second Embodiment (corresponding to the second implementation):

In the step 1, an eNB carries indication information in a Path Switch Request message transmitted to a serving MME of a UE, where the indication information indicates:

A. Whether the UE corresponding to the Path Switch Request message is connected to the network through a (mobile) RN; or B. Whether a new pair of {NH, NCC} needs to be generated for the current path switch procedure.

In the step 2, the serving MME of the UE judges from the received Path Switch Request message whether a new pair of {NH, NCC} needs to be generated.

The judgment is made particularly as follows:

A. If the Path Switch Request indicates that the UE is connected to the network through a (mobile) RN, then the serving MME will not perform any operation on a stored NH corresponding to the UE; otherwise, the serving MME generates a new pair of {NH, NCC} corresponding to the UE from the stored NH of the UE and replaces the stored pair of {NH, NCC} corresponding to the UE with the generated new pair of {NH, NCC} corresponding to the UE; or B. If the Path Switch Request message indicates that no new pair of {NH, NCC} needs to be generated, then the serving MME will not perform any operation on a stored NH; otherwise, the serving MME generates a new pair of {NH, NCC} corresponding to the UE from the stored NH of the UE and replaces the stored pair of {NH, NCC} corresponding to the UE with the generated new pair of {NH, NCC} corresponding to the UE; and In the step 3, the serving MME of the UE transmits the currently stored (i.e., the latest) pair of {NH, NCC} corresponding to the UE to a path switch target eNB in a Path Switch Request ACK message.

The eNB in this second embodiment is a DeNB of the RN or the RN.

Apparatuses corresponding to the respective methods above will be briefly introduced below.

Figure 10:
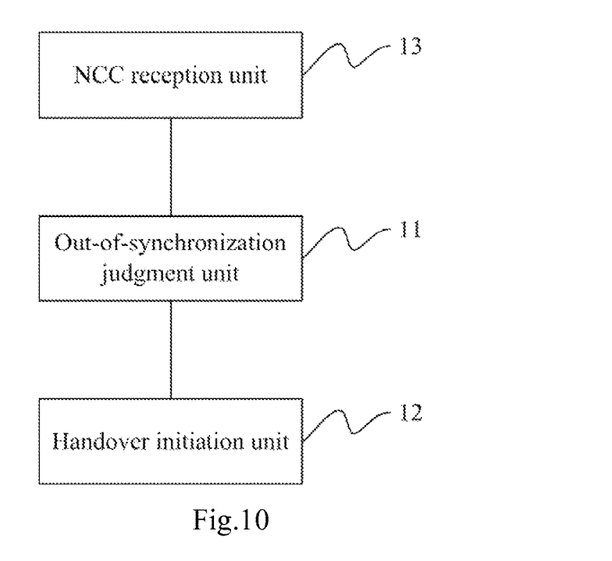
FIG. 10 is a schematic structural diagram of an intra-cell handover apparatus at the RN side according to an embodiment of the invention.

In correspondence to the first implementation above, referring to FIG. 10, an intra-cell handover apparatus at the RN side according to an embodiment of the invention includes:

An out-of-synchronization judgment unit 11 is configured to judge whether the difference between an NCC at the UE side, and an NCC lastly received by the RN, which is allocated to the UE by the UE's serving MME, satisfies a preset intra-cell handover trigger condition; and A handover initiation unit 12 is configured to initiate an intra-cell handover when the difference satisfies the trigger condition.

Preferably the out-of-synchronization judgment unit 11 is further configured:

To judge whether the difference between the NCC at the UE side, and the NCC lastly received by the RN, which is allocated to the UE by the serving MME, is below or equal to a preset intra-cell handover trigger value, and if so, to determine that the difference satisfies the trigger condition; otherwise, to determine that the difference does not satisfy the trigger condition.

Preferably the preset intra-cell handover trigger value is $2^n-1$, where n represents the number of bits of an NCC.

Preferably the apparatus further includes:

An NCC reception unit 13 is configured, when the RN is handed over between Donor evolved Node Bs (DeNBs), the RN receiving the NCC, forwarded by the target DeNB, which is allocated to the UE by the serving MME; or when the RN is handed over between DeNBs, the RN receiving the NCC, transmitted by the serving MME, which is allocated by the serving MME to the UE.

Figure 11:
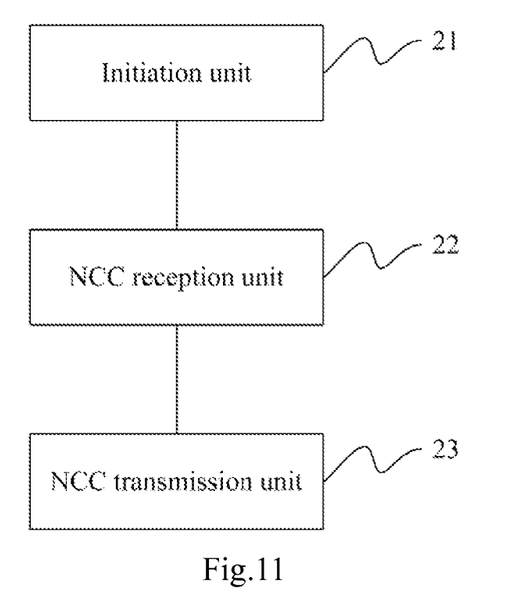
FIG. 11 is a schematic structural diagram of a path switch apparatus at the DeNB side according to an embodiment of the invention.

In correspondence, referring to FIG. 11, an intra-cell handover apparatus at the DeNB side according to an embodiment of the invention includes:

An initiation unit 21 is configured to initiate a path switching procedure when a Relay Node (RN) is handed over between DeNBs;

An NCC reception unit 22 is configured to receive from a serving MME of a UE a Next Hop Chaining Counter (NCC) allocated by the MME to the UE in the path switching procedure; and An NCC transmission unit 23 is configured to transmit the NCC to the RN.

Preferably the NCC reception unit 22 is further configured:

To receive from the serving MME of the UE the NCC allocated by the MME to the UE in a Path Switch Request ACK message.

Figure 12:
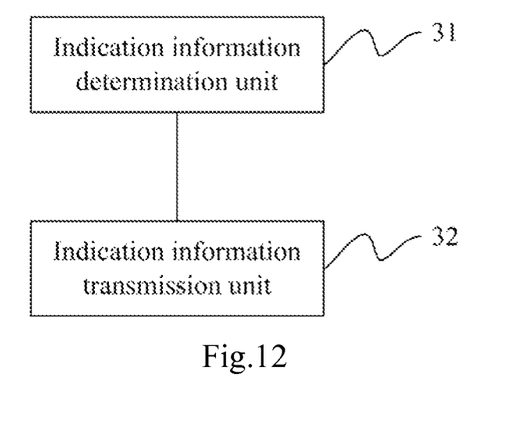
FIG. 12 is a schematic structural diagram of a path switch apparatus at the eNB side according to an embodiment of the invention.

In correspondence to the second implementation above, referring to FIG. 12, a path switch apparatus at the eNB side (which may be a DeNB or an RN) according to an embodiment of the invention includes:

An indication information determination unit 31 is configured to determine indication information, wherein the indication information is configured to instruct a serving Mobility Management Entity (MME) of a User Equipment (UE) not to allocate a new NH to the UE in a path switch procedure; and An indication information transmission unit 32 is configured to transmit the indication information to the serving MME of the UE.

Preferably the indication information transmission unit 32 is further configured:

To transmit a Path Switch Request message carrying the indication information to the serving MME of the UE.

Preferably the indication information indicates:

Whether the UE for which the Path Switch Request message is intended is connected to the network through an RN; or Whether a new NH needs to be generated for the current path switch procedure.

Figure 13:
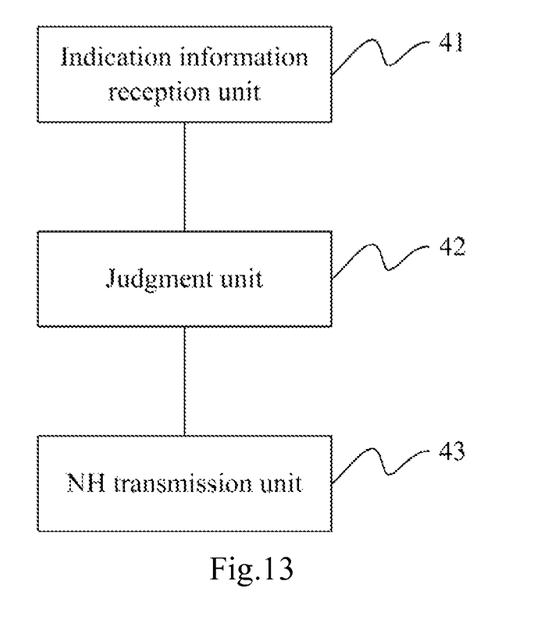
FIG. 13 is a schematic structural diagram of a path switch apparatus at the MME side according to an embodiment of the invention.

In correspondence, referring to FIG. 13, a path switch apparatus at the serving MME side of a UE according to an embodiment of the invention includes:

An indication information reception unit 41 is configured to receive indication information transmitted by an eNB to instruct a serving MME of a UE not to allocate a new NH to the UE in a path switch procedure;

A judgment unit 42 is configured to judge from the indication information whether a new NH needs to be generated for the UE in the path switch procedure; and An NH transmission unit 43 is configured to transmit the latest NH corresponding to the UE to a path switch target eNB.

Preferably the indication information reception unit 41 is further configured:

To receive a Path Switch Request message transmitted by the eNB and to obtain the indication information from the message.

Preferably the judgment unit 42 is further configured:

When the indication information in the Path Switch Request message indicates that the UE is connected to the network through an RN, not to perform any operation on a currently stored NH corresponding to the UE; otherwise, to generate a new NH corresponding to the UE from the currently stored NH corresponding to the UE; or When the indication information in the Path Switch Request message indicates that no new NH needs to be generated, not to perform any operation on a currently stored NH corresponding to the UE; otherwise, to generate a new NH corresponding to the UE from the currently stored NH corresponding to the UE.

In summary, in the embodiments of the invention, it can be ensured at the RN side that an intra-cell handover will be initiated to synchronize NCCs at the UE and network sides before out-of-synchronization of the NCCs at the network side and the UE side occurs. Particularly a DeNB transmits a pair of {NH, NCC} received from an MME to the RN; and the mobile RN calculates the difference between the NCC currently transmitted by the MME and the NCC used at the UE side and initiates an intra-cell handover to synchronize the NCC at the UE side before out-of-synchronization of the NCCs at the network side and the UE side occurs; and Moreover in the embodiments of the invention, the serving MME of the UE can be further instructed at the eNB side not to generate a new pair of {NH, NCC}. Particularly the DeNB or the RN adds an indicator to a Path Switch Request message to notify the serving MME of the UE whether a new pair of {NH, NCC} needs to be generated; and the serving MME of the UE judges from the indicator of the DeNB or the RN whether a new pair of {NH, NCC} needs to be generated.

Thus with the technical solutions according to the embodiments of the invention, it is possible to avoid out-of-synchronization of NCCs between the network side and the UE side when the UE is handed over out of the RN, which might otherwise result in failure of communication; and moreover an occasion at which the RN initiates an intra-cell handover can be selected for the purpose of synchronizing the NCCs without greatly increasing the number of handovers of the UE via an air interface.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. An intra-cell handover method, comprising:
   a Relay Node (RN) judging whether the difference between a Next Hop Chaining Counter (NCC) at the User Equipment (UE) side, and an NCC lastly received by the RN, which is allocated to the UE by a serving Mobility Management Entity (MME), satisfies a preset intra-cell handover trigger condition; and
   the RN initiating an intra-cell handover when the difference satisfies the trigger condition;
   wherein the RN judging whether the difference between the NCC at the UE side, and the NCC lastly received by the RN, which is allocated to the UE by the serving MME, satisfies the preset intra-cell handover trigger condition comprises:
   the RN judging whether the difference between the NCC at the UE side and the NCC lastly received by the RN, allocated to the UE by the serving MME, is below or equal to a preset intra-cell handover trigger value, and if so, then determining that the difference satisfies the trigger condition; otherwise, determining that the difference does not satisfy the trigger condition.

2. The method of claim 1, wherein the preset intra-cell handover trigger value is $2^n-1$, wherein n represents the number of bits of an NCC.

3. The method of claim 2, wherein n represents a positive integer above or equal to 3.

4. The method of claim 1, wherein the method further comprises:
   when the RN is handed over between Donor evolved Node Bs (DeNBs), the RN receiving the NCC, forwarded by the target DeNB, which is allocated to the UE by the serving MME; or when the RN is handed over between DeNBs, the RN receiving the NCC, transmitted by the serving MME, which is allocated by the serving MME to the UE.

5. The method of claim 4, wherein the method further comprises:
when a Relay Node (RN) is handed over between Donor evolved Node Bs (DeNBs), the DeNB initiating a path switching procedure;
the DeNB receiving from a serving Mobility Management Entity (MME) of a User Equipment (UE) a Next Hop Chaining Counter (NCC) allocated by the MME to the UE in the path switching procedure; and
the DeNB transmitting the NCC to the RN.

6. The method of claim 5, wherein the DeNB receiving from the serving MME of the UE the NCC allocated by the MME to the UE in the path switching procedure comprises:
the DeNB receiving from the serving MME of the UE the NCC allocated by the MME to the UE in a Path Switch Request ACK message.

7. A path switch method, comprising:
an evolved Node B (eNB) determining indication information to instruct a serving Mobility Management Entity (MME) of a User Equipment (UE) not to allocate a new Next Hop (NH) key to the UE in a path switch procedure; and
the eNB transmitting the indication information to the serving MME of the UE;
wherein the indication information indicates:
whether the UE corresponding to a Path Switch Request message carrying the indication information is connected to the network through a Relay Node (RN); or
whether a new NH needs to be generated for the current path switch procedure.

8. The method of claim 7, wherein the eNB transmitting the indication information to the serving MME of the UE comprises:
the eNB transmitting a Path Switch Request message carrying the indication information to the serving MME of the UE.

9. A path switch method, comprising:
a serving Mobility Management Entity (MME) of a User Equipment (UE) receiving indication information transmitted by an evolved Node B (eNB), wherein the indication information is configured to instruct the serving MME of the UE not to allocate a new Next Hop (NH) key to the UE in a path switch procedure;
the serving MME of the UE judging from the indication information whether a new NH needs to be generated for the UE in the path switch procedure; and
the serving MME of the UE transmitting the latest NH corresponding to the UE to a path switch target eNB;
wherein the indication information indicates:
whether the UE corresponding to a Path Switch Request message carrying the indication information is connected to the network through a Relay Node (RN); or
whether a new NH needs to be generated for the current path switch procedure.

10. The method of claim 9, wherein the serving MME of the UE receiving the indication information transmitted by the eNB comprises:
the serving MME of the UE receiving a Path Switch Request message transmitted by the eNB and obtaining the indication information from the message.

11. The method of claim 9, wherein the serving MME of the UE judging from the indication information whether a new NH needs to be generated for the UE in the path switch procedure comprises:
when the indication information in the Path Switch Request message indicates that the UE is connected to the network through an RN, the serving MME of the UE not performing any operation on a currently stored NH corresponding to the UE; otherwise, generating a new NH corresponding to the UE from the currently stored NH corresponding to the UE; or
when the indication information in the Path Switch Request message indicates that no new NH needs to be generated, the serving MME of the UE not performing any operation on a currently stored NH corresponding to the UE; otherwise, generating a new NH corresponding to the UE from the currently stored NH corresponding to the UE.

* * * * *